United States Patent Office 3,223,676
Patented Dec. 14, 1965

3,223,676
PROCESS FOR PRODUCING A MOLDED GASKET FROM POLYTETRAFLUOROETHYLENE AND A BUTADIENE-ACRYLONITRILE ELASTOMER
Howard L. Rucker, Somerville, N.J., assignor to Johns-Manville Corporation, New York, N.Y., a corporation of New York
No Drawing. Filed July 7, 1960, Ser. No. 41,240
4 Claims. (Cl. 260—41.5)

The present invention relates to elastomeric compositions. More particularly, this invention concerns the use of such compositions as sealing materials and new, improved gaskets made therefrom.

Compositions which are to be used as sealing, packing and gasket materials should possess a number of different properties including:

(a) Good resiliency;
(b) Inertness or resistance to the deleterious effects of oils or chemicals such as swelling or deterioration, which contact the gasket material in use;
(c) High tensile strength;
(d) Good abrasion resistance;
(e) Stability against distortion or deterioration under wide temperature changes and other atmospheric conditions;
(f) Ability to be converted into a thermosetting or non-thermoplastic condition for its ultimate use; and
(g) Good molding and preform characteristics to enable ready fabrication.

In addition, it is desirable in many applications for the material to have a low coefficient of friction so that torque values required to install the material in a sealing position will be as low as possible.

Many different types of materials have been used as the basic ingredient of gasket materals, but synthetic rubbers and particularly such materials as copolymers or interpolymers of butadiene are a particular favorite of gasket fabricators. The synthetic rubber is usually compounded with fillers and plasticizers to produce the final compositions from which the gaskets or other sealing materials are formed. U.S. Patents 2,330,353, 2,373,461, and 2,473,319 are typical of prior disclosures of such compositions.

However, the compounding of sealing materials to provide all of the desired properties mentioned above presents considerable difficulty. For example, base materials used in the compositions to provide resiliency and tensile strength, e.g., synthetic rubber, do not possess sufficient resistance to oils, chemicals, and other corrosive means. Inclusion of inert fillers to increase oil resistance usually adversely affects the coefficient of friction and sealing characteristics. Plasticizers generally aid the sealing properties but lower tensile strength and abrasion resistance and oil resistance and in some instances, because of their thermoplastic nature, limit the ultimate use. Accordingly, there is a genuine need for improvement in the compounding of sealing compositions and the discovery of new methods by which the complete range of desired properties for such materials can be attained to the fullest extent.

It is therefore a principal object of the present invention to provide new elastomeric compositions which are particularly useful as sealing, packing and gasket materials which meet all of the above characteristics.

A further object of this invention is the production of new, improved gasket materials and gaskets.

Another object of the present invention is the providing of new methods for improving the tensile strength and the oil resistance of synthetic rubbers.

A further object of this invention is the providing of elastomeric compositions which exhibit substantially no change in volume and high tensile after extended contact with aromatic oil.

A still further object of this invention is the provision of gasket materials having improved sealing characteristics, good abrasion resistance and low coefficient of friction.

Another object of this invention is the provision of elastomeric compositions exhibiting very good tensile strengths and inertness to normally harmful materials combined with a low coefficient of friction.

An additional object of this invention is the preparation of elastomeric compositions which readily lend themselves to injection, transfer and compression molding techniques as well as to fabrication from preforms made by wrapping, extrusion or die-cutting methods.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

These objects are accomplished in accordance with the present invention by dispersing tetrafluoroethylene polymer in particulate form within an elastomer, specifically butadiene-acrylonitrile rubber. The resulting product synergistically combines the good characteristics of the elastomer with the good qualities of the tetrafluoroethylene polymer. As a result, the product is ideally suited to applications requiring high resiliency and strength, while providing exceptional resistance to the harmful effects of substances such as chemicals and oils, in addition to low torque effect, improved sealing characteristics and good resistance to abrasion.

The success of the present invention is due in part to the discovery that although the tetrafluoroethylene polymer apparently does not flux or react with the synthetic rubber, and remains a dispersion in a matrix formed of the rubber, its presence does not deleteriously affect the rubber but rather greatly increases the tensile strength of the rubber and creates other desirable properties in the resulting composition. Why this occurs is not completely understood, but it does make possible gasket and molding materials having new and unique characteristics.

Such characteristics render the product especially useful in the preparation of gasket, seal and packing structures and particularly in the preparation of such structures for use in applications accompanied by exposure to deteterious substances, such as in oil field service.

It has further been established that unusually high tensile strengths, equalled only by hard rubbers, may be imparted to the products of the invention by means of an oil aging treatment.

Also significant are the molding characteristics of the compounds of the present invention which readily lend themselves to injection, transfer and compression molding, unlike less workable compositions comprising polytetrafluoroethylene alone, as well as to fabrication from preforms formed by wrapping, extrusion or die-cutting methods.

EXAMPLE 1

In a preferred embodiment, a composition was prepared by the admixture of the following materials:

| Material: | Parts by weight |
|---|---|
| Rubbery butadiene-acrylonitrile copolymer (1) | 165 |
| Tetrafluoroethylene polymer (2) | 16.3 |
| Asbestos floats | 165 |
| Carbon black (3) | 132.5 |
| Acrylonitrile polymer (4) | 60 |

EXAMPLE 1—Continued

| Material—Continued | Parts by weight |
|---|---|
| Trimethyl dihydroquinoline polymer (5) | 6.3 |
| Dicumyl peroxide catalyst (6) | 10 |
| Polyethylene glycol dimethacrylate (7) | 50 |
| Total parts by weight | 605.1 |

Specific examples of the materials used above are:

(1) The rubbery butadiene-acrylonitrile employed is a Buna–N type synthetic rubber manufactured by Naugatuck Chemical Company under the trademark, Paracril–D.

(2) A particulate preparation of polytetrafluoroethylene manufactured by E. I. du Pont de Nemours & Company, and designated Teflon # 6.

(3) Fifty parts Philblack A, a medium abrasion furnace black prepared by Phillips Chemical Company and 82.5 parts of Thermax, a medium thermal carbon black made by R. T. Vanderbilt Company, are employed.

(4) The acrylonitrile polymer is a product manufactured by E. I. du Pont de Nemours & Company under the trademark Orlon.

(5) Polymerized trimethyl dihydroquinoline is an antioxidant manufactured by R. T. Vanderbilt Company under the trademark Age Rite Resin D.

(6) The dicumyl peroxide catalyst is a preparation of 40% dicumyl peroxide precipitated in 60% calcium carbonate which is prepared by Hercules Powder Company under the trademark Di-cup 40–C.

(7) The polyethylene-glycol dimethacrylate used is a product prepared by Union Carbide Company and known as Monomer MG–1.

In one method of preparing the preferred composition from the above materials, the acrylonitrile polymer is added to the band refined butadiene-acrylonitrile copolymer and mixed by conventional means such as a roller mill or Banbury mixer. One half of the polyethylene glycol dimethacrylate is then added and mixed therewith. The asbestos floats are then added and dispersed in the batch. The remainder of the polyethylene glycol dimethacrylate, trimethyl dihydroquinoline polymer, particulate polytetrafluoroethylene, carbon black and dicumyl peroxide catalyst are then successively added with mixing after each respective addition. The composition is then formed into sheets, rods and channels by extrusion, calendering and roller forming.

The following table sets forth certain properties of the composition derived from the above materials by the procedure of preparing the composition described in the preceding paragraph:

| | |
|---|---|
| Tensile strength (p.s.i.) | 2,910 |
| Elongation (percent) | 37 |
| Hardness (Shore D) | 66 |
| Specific gravity | 1.35 |

It is to be noted that the tensile strengths of the products of the invention may be significantly increased by means of oil aging treatments in which they are immersed in an oil bath and held at high temperatures over periods of time extending up to 70 hours. The effects of such treatment upon the product of Example 1, are demonstrated by the following tables:

*Aged in ASTM #3 oil, 70 hours at 212° F.*

| | |
|---|---|
| Tensile strength (percent change) | +19.0 |
| Elongation (percent change) | −27.0 |
| Volume (percent change) | 0.0 |
| Hardness (units change) (Shore D) | +2.0 |

*Aged in Mississippi-Sonex crude oil*

6 hours at 350° F.:

| | |
|---|---|
| Hardness (units change) (Shore D) | 0.0 |
| Volume (percent change) | 0.0 |

70 hours at 350° F.

| | |
|---|---|
| Hardness (units change) (Shore D) | +4.0 |
| Volume (percent change) | 0.0 |

*Aged in gas distillate from Eureka oil fields (plow #11)*

70 hours at 212° F.:

| | |
|---|---|
| Volume (percent change) | +6.4 |

The tensile strength and elongation data of the above and following examples prior to immersion in a liquid was determined by the ASTM D–412–51T.

The test used to determine the percentage change of the above and following examples after immersion in the various oil baths was ASTM D–471–57T.

The product produced by Example 1 was also satisfactorily utilized in molding objects of varied forms including V-rings, Otis safety valve cups and A-cups, as well as in varying techniques employing wrapped and die cut preforms.

In addition to the aforegoing preferred embodiment, compositions within the scope of the invention comprising the materials set forth in the following table and designated in the following table as Examples 2 through 8 were prepared using the method described in Example 1.

| Material (Parts by Weight) | 2 | 3 | 4 | 5 | 6 | 7 | 8 |
|---|---|---|---|---|---|---|---|
| Rubbery Butadiene-Acrylonitrile Copolymer [1] | 100 | 100 | 100 | 165 | 100 | 165 | 165 |
| Tetrafluoroethylene Polymer [8] | 10 | 25 | 10 | 16.9 | 10 | 16.9 | 16.2 |
| Asbestos Floats | 100 | 100 | 150 | 165 | 150 | 165 | 165 |
| Sulfur | 9.9 | 9.9 | 9.9 | 16.2 | 9.9 | 16.2 | |
| Zinc Oxide | 5.1 | 5.1 | 5.1 | 8.1 | 5.1 | 8.1 | |
| Carbon Black [9] | 30 | 30 | 30 | 49.3 | 30 | 49.3 | 49.3 |
| Acrylonitrile Polymer [4] | 30 | | 30 | 49.3 | 30 | 49.3 | 60 |
| Trimethyl Dihydroquinoline Polymer [5] | 2.1 | 2.1 | 2.1 | 3.8 | 2.1 | 3.8 | 6.25 |
| Paracoumarone-Indene Resin [10] | 10.2 | 10.2 | 5.1 | 8.1 | 5.1 | 8.1 | |
| Alkyl Phenol Disulfide [11] | 5.1 | 5.1 | 5.1 | 8.1 | 5.1 | 8.1 | |
| 2-benzothiazyl NN-Diethyl Thiocarbamyl Sulfide [12] | .75 | .75 | .75 | 1.25 | .75 | 1.25 | |
| Petrolatum | | | | 5.1 | 8.1 | 5.1 | |
| Ethylene Polymer [13] | | | | 16.2 | 10 | 16.2 | 16.2 |
| Dicumyl Peroxide Catalyst [6] | | | | | | | 10 |
| Phenol-Formaldehyde Resin [14] | | | 10 | | | | |
| Furfural Acetone [15] | | | | | | 24.4 | |
| Polyethylene Glycol Dimethacrylate [7] | | | | | | | 49.3 |
| Total Parts by Weight | 303.15 | 288.15 | 363.15 | 515.35 | 363.15 | 531.65 | 537.25 |

[1,4,5,6,7] The materials set forth in the specific examples to Example 1 are also employed in the above examples.

[8] In Examples 1, 4, 5, 6, 7, and 8, Teflon #6, a particulate preparation of polytetrafluoroethylene prepared by E. I. du Pont de Nemours is employed, while in examples 2 and 3, a similar compound manufactured by the same firm and designated Teflon 3086 is utilized.

[9] The carbon black employed as a medium abrasion furnace black prepared by Phillips Chemical Company under the trademark Philblack A.

[10] The paracoumarone-indene resin utilized is a preparation known as Picco-25, which is manufactured by Pennsylvania Industrial Chemical Corporation.

[11] A pigment disperser and tack increaser produced by Sharples Chemicals, Inc. under the trademark Vultac #3.

[12] A vulcanization accelerator known as Ethylac which is produced by Sharples Chemicals, Inc.

[13] A low molecular weight ethylene polymer known as AC Polyethylene and prepared by the Semet-Solvay Petro-chemical Division of Allied Chemical and Dye Company.

[14] A molding compound manufactured under the trademark Durez 12687 by Durez Plastics and Chemicals, Inc.

[15] A mixture of mono and difurfuryl acetones manufactured by the Irvington Varnish and Insulator Company, under the trademark Cardolite #1357.

The compositions of Examples 2 to 8 were adaptable to a variety of forming techniques. As an example, the composition of Example 5 was successfully extruded from a Royle extruder to form preforms for V-ring structures.

Characteristics of the above compositions are set forth in the following table:

EXAMPLES

|  | 2 | 3 | 4 | 5 | 6 | 7 | 8 |
|---|---|---|---|---|---|---|---|
| Tensile Strength (p.s.i.) | 3,770 | 3,960 | 4,660 | 3,200 | 3,975 | 2,880 | 2,850 |
| Elongation (Percent) | 30 | 47 | 12.5 | 30 | 12.5 | 40 | 37 |
| Hardness (Shore D) | 100 | 99 | *94 | *89 | *95 | *89 | 62 |
| Specific Gravity |  |  |  |  |  | 1.45 | 1.35 |

*Shore C-2.

The compositions of Examples 2 to 6 and 8 were also oil aged to bring about the changes set forth in the following table:

EFFECTS

| Example No. | Oil Bath | Temperature (° F.) | Duration (Hours) | Tensile Strength (Percent change) | Elongation (Percent change) | Hardness (Units change) | Volume (Percent change) |
|---|---|---|---|---|---|---|---|
| 2 | ASTM #3 Oil | 212 | 70 | +32 | −43.5 | 1+3 | 0 |
|  | ASTM #3 Oil | 300 | 70 | +128 | −85 | 1+3 | 0 |
| 3 | ASTM #3 Oil | 212 | 70 | +34 | −47 | 1+3 | 0 |
|  | ASTM #3 Oil | 300 | 70 | +79 | −93 | 1+4 | 0 |
| 4 | Oil from Eureka fields | 212 | 70 | −26.5 | +100 | 2−1 | +9 |
| 5 | ASTM #3 Oil | 212 | 70 | +103 |  | 2+9 | 0 |
| 6 | Oil from Eureka fields | 212 | 70 | −27 | +100 | 2−4 | +7.3 |
| 7 |  |  |  |  |  |  |  |
| 8 | ASTM #3 Oil; Gas Distillate from Eureka fields. | 212 | 70 | +5 | −19 | 1−5 | +1.9 |
|  |  | 212 | 70 |  |  |  | +10 |

¹ Shore D.  ² Shore C-2.

Thus, it may be seen that generally speaking, the high tensile strengths of the compositions of the present invention may be significantly increased through the expedient of oil aging.

The basic concept of the invention is further adaptable to manipulations which effect the preparation of compositions ranging through a broad spectrum of characteristics. The selected characteristics of tensile strength, inertness and a low coefficient of friction which are imparted to the elastomer through the addition of the tetrafluoroethylene polymer are controlled in degree by the ratio of the tetrafluoroethylene polymer to the elastomer, particularly within the range of 5 to 60 parts by weight of tetrafluoroethylene polymer for each 100 parts of elastomer. For example, compositions retaining substantially all of the resiliency of the elastomer and also partaking of the inertness, strength and desirable frictional properties of the polymer may be obtained by the addition of relatively small quantities of the tetrafluoroethylene polymer, in the neighborhood of 5 to 10% by weight of the elastomer.

In addition, the products' characteristics may be varied by the addition of various filler materials, pigments, etc. In this regard, the percentage of the total composition which comprises the elastomer may range preferably from 25% to 96% by weight. For example, in a composition consisting merely of the elastomer and tetrafluoroethylene polymer, the preferred percentage of elastomer present ranges between 60% to 96% by weight. However, when additional substances such as filler materials are utilized, the percentage of elastomer present in the overall composition may range as low as 25% or lower by weight.

Alternatively, the characteristics of tensile strength, inertness and a low coefficient of friction exhibited by the final product may be enhanced by increasing the proportion of the polymer to 40 to 60% by weight of the elastomer.

While a butadiene-acrylonitrile copolymer comprising about 40 to 70% by weight of butadiene-1, 3 and 30 to 60% by weight of acrylonitrile is particularly useful in forming the new, improved elastomeric compositions of this invention; other elastomers or rubbery polymers which bring selected characteristics into combination with the desirable properties of a tetrafluoroethylene polymer may also be employed. Examples of such compounds are other butadiene-acrylonitrile copolymers, butadiene-styrene copolymers, butyl rubber, chloroprenes, polybutene, thiokols, rubber hydrochloride, polyisobutylenes, silicone rubbers, elastomeric polymerized esters of acrylic and methacrylic acid, etc.

As demonstrated by the examples, additional materials such as pigments, fillers, supplemental resins, plasticizers, anti-oxidants, accelerators, tack-increasers, etc., may also be added to the compositions. Filler materials equivalent in weight to twice the amount of elastomer utilized may be employed while pigments ranging up to 50% of the weight of the elastomer may be included. The amount of additional resins used may also equal 50% of the weight of the elastomer and plasticizers and accelerators and antioxidants comprising up to 25% of the weight of the elastomer may be added.

While the products of the present invention are particularly useful as gasket materials and especially in the fabrication of gaskets for utilization in oil field service or similar usages entailing exposure to oils or harmful chemicals, they are equally applicable in the preparation of molding materials in general and specifically in the preparation of items enhanced by the characteristics of inertness, great tensile strength and a low coefficient of friction.

Having provided a complete description of the invention in such manner as to distinguish it from other inventions and from what is old, and having provided a description of the best mode contemplated of carrying out the invention, thus complying with the present patent statutes, the scope of patent protection to be granted the invention is defined by the following claims.

What I claim is:

1. A process of producing a gasket comprising preparing a composition consisting essentially of polytetrafluoroethylene in solid particulate condition mixed in an elastomeric butadiene-acrylonitrile copolymer matrix in an amount between 5 and 60 parts per weight for each 100 parts of said copolymer, and forming the composition into a desired self-containing and self-supporting shape under the influence of heat and pressure.

2. A process as described in claim 1 wherein the copolymer is present in amount between 25 and 96% by weight of the total composition.

3. A process as described in claim 1 wherein the composition comprises the following ingredients in the parts by weight indicated:

| | |
|---|---|
| Rubbery butadiene-acrylonitrile copolymer | 100 to 165 |
| Tetrafluoroethylene polymer in particulate condition | 10 to 25 |
| Asbestos fibers | 100 to 165 |
| Rubber pigments | 30 to 60 |
| Synthetic fibers | up to 50 |
| Vulcanization agents | 5 to 25 |

4. A process as claimed in claim 1 wherein the composition is heated for at least 6 hours to at least 212° F. to increase the tensile strength properties of the composition.

References Cited by the Examiner

UNITED STATES PATENTS

| | | | |
|---|---|---|---|
| 2,459,721 | 1/1949 | Poltorak. | |
| 2,473,319 | 6/1949 | Winkelmann | 260—38 |
| 2,717,025 | 9/1955 | Jelinek. | |
| 2,718,452 | 9/1955 | Lontz. | |
| 2,754,223 | 7/1956 | Caroselli | 260—29.6 XR |
| 2,777,783 | 1/1957 | Welch | 260—43 |
| 2,824,089 | 2/1958 | Peters et al. | |
| 2,844,557 | 7/1958 | Welch. | |
| 2,976,257 | 3/1961 | Dawe et al. | 260—43 |
| 3,019,206 | 1/1962 | Robb | 260—45.7 XR |

MORRIS LIEBMAN, *Primary Examiner.*

ALPHONSO D. SULLIVAN, MILTON STERMAN, ALEXANDER H. BRODMERKEL, *Examiners.*